United States Patent [19]

Kawamura et al.

[11] Patent Number: 4,855,898
[45] Date of Patent: Aug. 8, 1989

[54] NC DATA CREATION METHOD

[75] Inventors: Hideaki Kawamura; Teruyuki Matsumura; Takahiko Mineshige, all of Tokyo, Japan

[73] Assignee: Fanuc Ltd, Minamitsuru, Japan

[21] Appl. No.: 93,020

[22] PCT Filed: Dec. 10, 1986

[86] PCT No.: PCT/JP86/00625

§ 371 Date: Aug. 5, 1987

§ 102(e) Date: Aug. 5, 1987

[87] PCT Pub. No.: WO87/03525

PCT Pub. Date: Jun. 18, 1987

[30] Foreign Application Priority Data

Dec. 10, 1985 [JP] Japan ................................ 60-277747

[51] Int. Cl.$^4$ .............................................. G05B 19/18
[52] U.S. Cl. ................................ 364/191; 364/474.11; 364/474.22
[58] Field of Search ................................ 364/167-171, 364/474, 475, 188-192, 474.11, 474.22; 318/572, 568

[56] References Cited

U.S. PATENT DOCUMENTS

| | | | |
|---|---|---|---|
| 4,445,182 | 4/1984 | Morita et al. | 364/171 X |
| 4,490,781 | 12/1984 | Kishi et al. | 364/191 |
| 4,723,203 | 2/1988 | Kishi et al. | 364/171 |

FOREIGN PATENT DOCUMENTS 127687 10/1977 Japan .
82580 6/1979 Japan .

OTHER PUBLICATIONS

Translation of 54-82580 Japan 6/30/79.
Translation of 52-127687 Japan 10/26/77.

Primary Examiner—Allen MacDonald
Attorney, Agent, or Firm—Staas & Halsey

[57] ABSTRACT

The rotating direction of a spindle is stored in a tool data file storage area (101b) for each and every tool used.

Data necessary for creating an NC program are stored in a RAM (105) conversationally using an operator's panel (108) and graphic display unit (102). Thereafter, a processor (103) creates the NC program using the data stored in the RAM.

When a tool used in a predetermined machining process is decided during the creation of the NC program, a tool selection command for selecting the tool is outputted and, in addition thereto, a spindle rotating direction conforming to the selected tool is obtained from the tool data file storage area (101b) and a spindle rotating command for rotating the spindle in said direction is outputted.

4 Claims, 4 Drawing Sheets

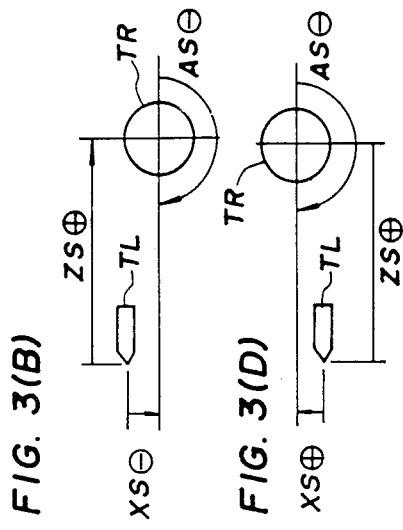
FIG. 3(B)
FIG. 3(D)
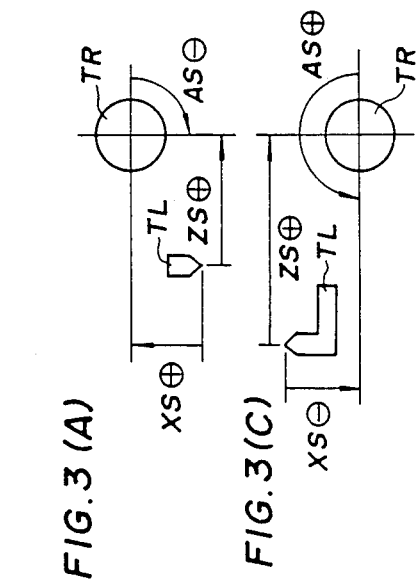
FIG. 3(A)
FIG. 3(C)

NC DATA CREATION METHOD

BACKGROUND OF THE INVENTION

FIELD OF THE INVENTION

This invention relates to a method of creating NC data and, more particularly, to an NC data creation method in which the rotating direction of a spindle is stored for each and every tool used and a spindle rotating direction command is outputted together with a tool selection instruction.

DESCRIPTION OF THE RELATED ART

As disclosed in the specification of U.S. Pat. No. 4,490,781, automatic programming systems are available for creating NC tapes (NC data) from a design drawing through a simple operation by entering data in a conversational mode using a graphic display screen. With such an automatic programming system, the necessary data are created sequentially in accordance with the following steps:
 (1) a step of inputting the material of a blank;
 (2) a step of inputting the format of the drawing;
 (3) a step of inputting the blank profile (chosen from among a cylinder, hollow cylinder and special profile blank) and profile dimensions;
 (4) a step of inputting the finished profile and finished profile dimensions;
 (5) a step of inputting a machine reference point and turret position;
 (6) a step of deciding a machining process;
 (7) a step of deciding a tool; and
 (8) a step of deciding cutting limits and cutting conditions.

The steps (6) through (8) are repeated until the final finished profile is obtained. The machining processes, the tools used in these machining processes, the cutting conditions and the cutting limits are decided automatically. For example, the following is registered in memory beforehand as a sequence of machining processes for machining a cylinder:
 (1) end face rough cutting;
 (2) outer diameter rough cutting;
 (3) end face finishing;
 (4) outer diameter finishing;
 (5) grooving; and
 (6) thread cutting.

Further, for each and every tool, a tool data file is registered which includes the name of the machining process in which the tool is used and tool shape data indicative of the tool.

When the cylinder is inputted as the shape of the blank and the finished profile is then inputted, the names of the machining processes are read out in the order in which the machining processes were registered and tools which will not interfere with the workpiece are selected, upon considering the finished profile and the shapes of the tools, from among the tools registered for the machining processes that have been read. In addition, a machining area is decided based on the blank profile and finished profile, and a direction for approaching the chuck (along the −X or −Z axis) is decided as the cutting direction.

When the inputting of all data necessary for creating NC data is completed by the foregoing steps, the NC data (an NC tape) are finally created in automatic fashion. As for automatically deciding the machining processes, see the, specifications of U.S. Ser. No. 767,264, now U.S. Pat. No. 4,723,203, and International Application No. PCT/JP85/00589. With regard to automatically deciding tools used, see the specification of U.S. Pat. No. 4,723,203.

In the prior art, spindle rotating direction is treated as being dependent upon the machining process and is stored beforehand in a parameter storage area. With each new machining process, the rotating direction is determined upon referring to the parameter storage area. The NC data are created upon outputting a spindle rotation command (M03 for forward rotation and M04 for reverse rotation)) together with a tool selection instruction. More specifically, a corresponding relationship between the machining process and spindle rotating direction (i.e. forward rotation for end face cutting, reverse rotation for outer diameter cutting, and so forth) is stored as a parameter in the parameter storage area in advance and the NC data are created upon determining the spindle rotating direction based on the corresponding relationship.

However, there are right-handed tools and left-handed tools, in which case the spindle rotating direction is fixed at either forward rotation or reverse rotation. If left- and right-handed tools are used, a workpiece cannot be machined unless the spindle is rotated in the direction decided by the particular tool.

With the prior-art method, however, the direction in which a spindle is rotated is decided in dependence upon the machining process without taking the left- and right-handedness of the tools into account. As a result, left- and right-handed tools cannot be used. If they were used, this would necessitate the subsequent revision of the NC data that have been created.

SUMMARY OF THE INVENTION

Accordingly, an object of the present invention is to provide an NC data creation method through which the direction in which a spindle is rotated can be decided in dependence upon the tool.

The rotating direction of a spindle is stored in a tool data file storage area for each and every tool used.

Data necessary for creating an NC program are stored in a RAM conversationally using an operator's panel and graphic display unit. Thereafter, a processor creates the NC program using the data stored in the RAM.

When a tool used in a predetermined machining process is decided during the creation of the NC program, a tool selection command for selecting the tool is outputted and, in addition thereto, a spindle rotating direction conforming to the selected tool is obtained from the tool data file storage area and a spindle rotating command for rotating the spindle in said direction is outputted.

BRIEF DESCRIPTION OF THE DRAWINGS

FIGS. 3(A)–3(D) are side views illustrating a method of mounting a tool on a turret.

DESCRIPTION OF THE PREFERRED EMBODIMENT

Figure 1:
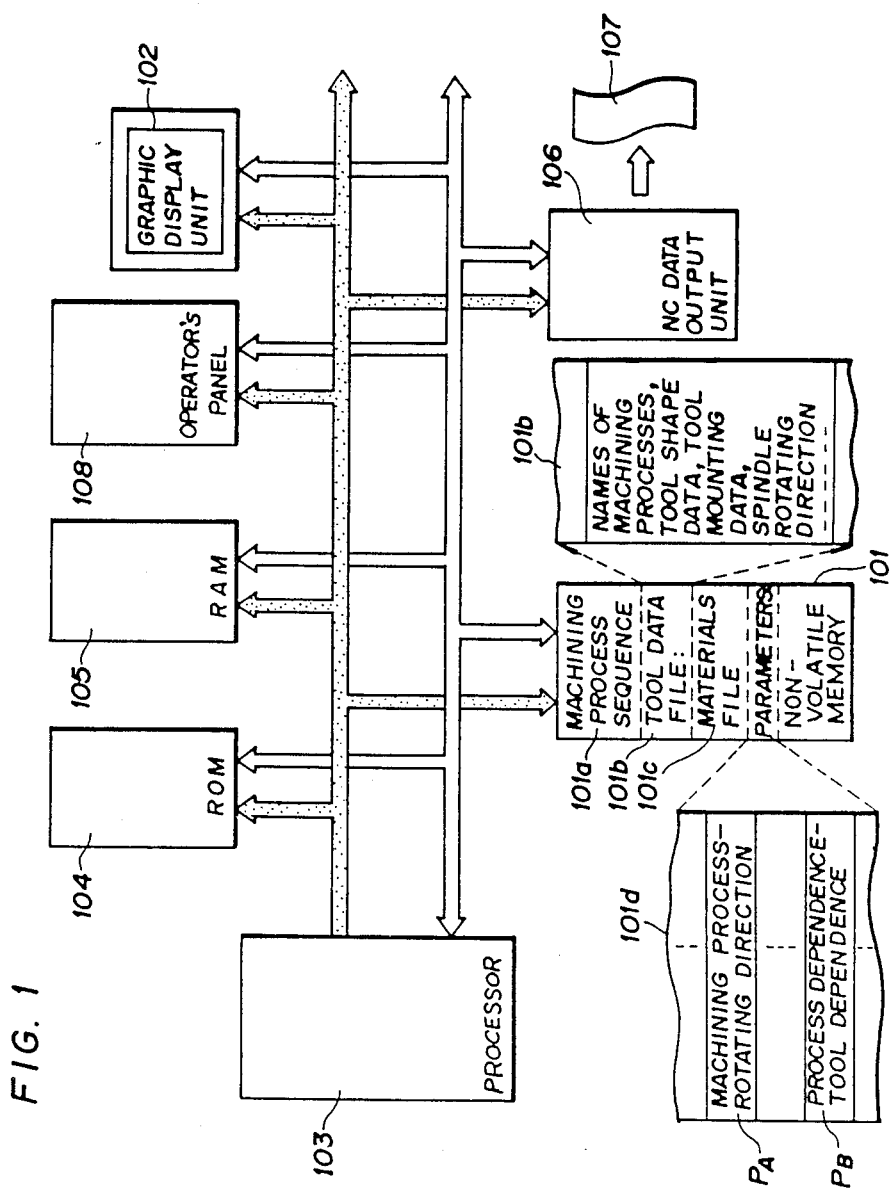
FIG. 1 is a block diagram of an automatic programming system.
Figure 2A:
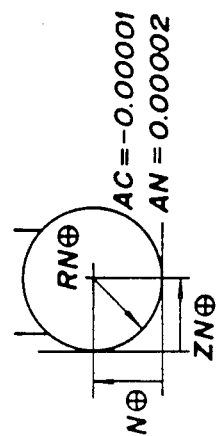
FIGS. 2(A)–2(H) are side views of tools of different shapes.
Figure 2B:
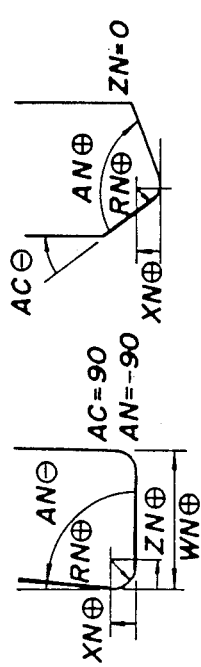
Figure 2C:
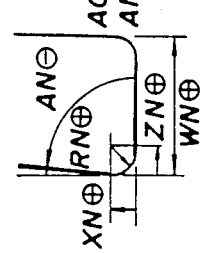
Figure 2D:
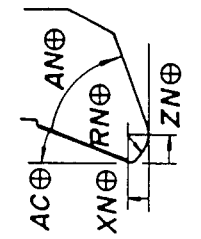
Figure 2E:
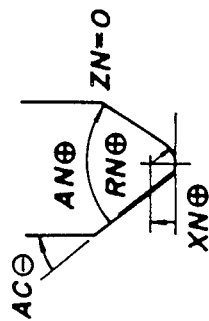
Figure 2F:
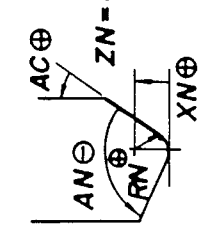
Figure 2G:
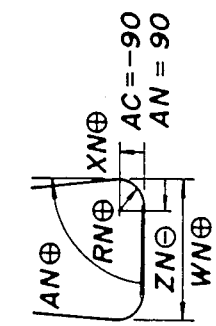
Figure 2H:
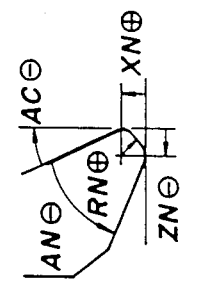

FIG. 1 is a block diagram of an automatic programming system for practicing the present invention.

Numeral 101 denotes a non-volatile memory having a storage area 101a in which a machining process sequence corresponding to each blank profile (cylinder, hollow cylinder and special profile) is stored in advance, a storage area 101b in which a tool data file (tooling file) is stored in advance, a storage area 101c in which a material file is stored in advance, and a storage are 101d in which parameters are stored in advance. An example of a machining process sequence for a case where the profile is a cylinder is as follows:

(1) end face rough cutting;
(2) outer diameter rough cutting;
(3) end face finishing;
(4) outer diameter finishing;
(5) grooving; and
(6) threading.

The tool data file includes the following for each and every tool:

(a) the name of a machining process in which the tool is used;
(b) tool shape data;
(c) data for mounting the tool on a turret; and
(d) data indicative of spindle rotating direction for when the tool is used.

FIGS. 2(A)-2(H) are side views of tool shapes. RN denotes tool nose radius, AC cutter angle, AN nose angle, XN, ZN imaginery nose positions, and WN nose width (inclusive of grooving cutting tool). The positive direction of the cutter angle AC is counterclockwise with a main cutter (the solid line in the drawing) serving as a reference, and the positive direction of the tool angle AN is clockwise with the main cutter serving as a reference. FIGS. 3(A)-3(D) are side views illustrating the mounting of a tool TL on a turret. The direction of the cutter and where the cutter is attached are inputted by being expressed in terms of a mounting angle S and mounting position ZS, XS. The positive direction of the mounting angle AS is counterclockwise.

Various parameters are stored in the parameter storage area 101d. The parameters related to the invention are as follows:

(a) a parameter $P_A$ indicating the correspondence between each machining process and spindle rotating direction, and
(b) a parameter $P_B$ indicating whether spindle rotating direction is decided in dependence upon the tool or, as in the prior art, in dependence upon the machining process.

Numeral 102 designates a graphic display unit, 103 a processor, 104 a ROM storing a control program, 105 a RAM for storing entered data, the results of processing and created NC data, 106 an NC data output unit for delivering created NC data to an external memory medium such as paper tape or bubble cassette. Numeral 108 denotes an operator's panel.

Figure 4:
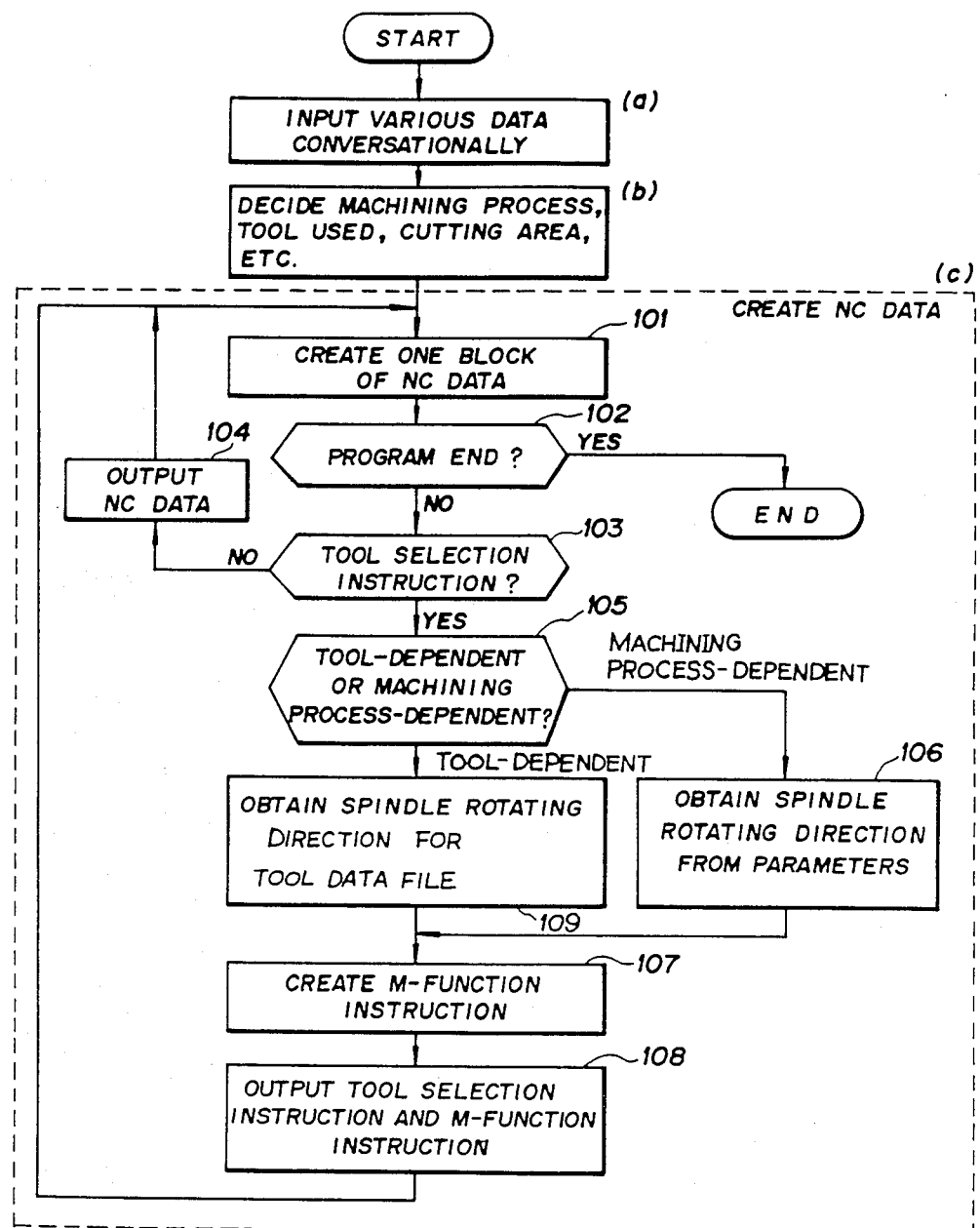
FIG. 4 is a flowchart of processing according to the invention.

Overall processing according to the invention will now be described in accordance with the flowchart shown in FIG. 4.

(a) As in the conventional method, the blank material, format of the design drawing, profile and dimensional values of the blank, finished profile and its dimensions, part profile (finished profile) and its dimensions, machine reference point and turret index position are inputted and stored in the RAM 105.

(b) The processor 103 checks whether the prevailing state is that for machining sequence determination. If this is the case, the machining processes, the tools used in the machining process, the cutting areas and the cutting directions are automatically decided. The criterion for tool selection is that a selected tool not interfere with the workpiece, as indicated in U.S. Pat. No. 4,445,182.

(c) When entry of all data necessary for NC data creation is completed by the foregoing steps, NC data (NC tapes) are finally created automatically. Specifically, each block of NC data is created sequentially, the NC data are checked to determine if the data are indicative of program end, NC data creation processing is concluded if the data are indicative of program end, and if the data are not indicative of program end, then it is determined whether they form a tool selection instruction (steps 101 through 103).

If the NC data do not form a tool selection instruction, then the NC data are outputted (step 104). If the NC data do form a tool selection instruction, then, before the tool selection instruction is outputted, the parameter $P_B$ is referred to in order to determine whether the spindle rotating direction is dependent upon the machining process or the tool (step 105).

If the spindle rotating direction is machining process-dependent, then, as in the prior art, the parameter $P_A$ is referred to in order to obtain a spindle rotating direction for the machining process using the selected tool (step 106), and an M-function instruction (M03 for forward and M04 for reverse) for rotating the spindle in said rotating direction is outputted after the tool selection instruction (T▭▭▭▭) (steps 107, 108).

If the spindle rotating direction is tool-dependent, however, the tool data file of the tool selected by the tool selection instruction is referred to in order to obtain the spindle rotating direction of the tool (step 109), and an M-function instruction (M03 for forward and M04 for reverse) for rotating the spindle in said rotating direction is outputted after the tool selection instruction (T▭▭▭▭).

Though the foregoing deals with a case where the data indicating whether the spindle rotation direction is machining process-dependent or tool-dependent is stored as a parameter, it is permissible to adopt an arrangement in which parameters are eliminated and the spindle rotating direction is assumed to be tool-dependent from the start.

In accordance with the present invention, the arrangement is such that a spindle rotating direction for each and every tool used is stored in a tool data file and, when NC data are created, a tool selection instruction for selecting a predetermined tool and a spindle rotating command for rotating the spindle in a direction commensurate with the tool are outputted. As a result, the rotating direction of a spindle can be decided in dependence upon the tool, so that the correct spindle rotating direction can be decided even if right- and left-handed tools are used.

What is claimed is:

1. A numerical control data creation method through which numerical data are created by previously registering, for each and every tool, a tool data file including names of machining processes using the tool and tool shape data indicative of the tools, then deciding machining processes necessary for obtaining a finished shape and selecting a predetermined tool from among tools registered as tools used in the machining processes, said method comprising the steps of:

(a) including in the tool data file of each and every tool a tool data rotation direction for that tool;

(b) outputting a tool selection command for selecting a predetermined tool, and a command for rotating the spindle in a spindle rotating direction conforming to the tool data rotation direction included in the tool data file of the predetermined tool; and (c) setting, prior to performing step (b), a parameter indicating whether the spindle rotating direction is determined in dependence upon the machining processes or in dependence upon the tools used.

2. The numerical control data creation method according to claim 1, wherein said outputting in step (b) includes the steps of:

(bi) referring to the parameter to distinguish between machining process-dependence and tool-dependence when outputting the tool selection command;

(bii) obtaining the tool data rotation direction of the predetermined tool from the tool file in a case where the spindle rotating direction is dependent upon the tools used; and (biii) outputting the spindle rotating command for rotating the spindle in the tool data rotation direction obtained in step (bii), together with the tool selection command.

3. The numerical control data creation method according to claim 2, further comprising the step of (d) storing, prior to performing step (b), a correspondence table indicating correspondence between each of the matching processes and a correspondence table rotation direction, and wherein said outputting in step (b) further comprises the steps of:

(biv) obtaining, in a case where the spindle rotating direction is determined in dependence upon the machining processes, the correspondence table rotation direction of a current machining process from the correspondence table; and (bv) outputting, together with the tool selection command, the spindle rotating command for rotating the spindle in the correspondence table rotation direction obtained in step (biv).

4. A method of creating numerical control data comprising the steps of:

(a) storing a tool data file for each tool, the tool data file including names of machining processes using the tool, tool shape data and a spindle rotating direction;

(b) determining the machining processes necessary for obtaining a finished shape;

(c) outputting a tool selection command for selecting one tool from among a plurality of tools used in the machining processes determined in step (b); and (d) outputting a command for rotating the spindle in a direction conforming to the tool selected by the tool selection command output in step (c).

* * * * *

UNITED STATES PATENT AND TRADEMARK OFFICE
CERTIFICATE OF CORRECTION

PATENT NO. : 4,855,898

DATED : August 8, 1989

INVENTOR(S) : Kawamura et al.

It is certified that error appears in the above-identified patent and that said Letters Patent is hereby corrected as shown below:

Col. 1, line 68, change "the," to --the--.

Col. 4, line 64, after "numerical" insert --control--.

Col. 6, line 3, delete "match-";

line 4, change "ing" to --machining--.

Signed and Sealed this

Twelfth Day of June, 1990

Attest:

HARRY F. MANBECK, JR.

*Attesting Officer*       *Commissioner of Patents and Trademarks*